(12) United States Patent
Seneschal-Merz et al.

(10) Patent No.: US 8,039,407 B2
(45) Date of Patent: *Oct. 18, 2011

(54) SINTERED GLASS CERAMIC AND METHOD FOR PRODUCING THE SAME

(75) Inventors: Karine Seneschal-Merz, Mainz (DE); Bernd Hoppe, Ingelheim (DE); Dirk Sprenger, Stadecken-Elsheim (DE); Martin Letz, Mainz (DE); Thilo Zachau, Buerstadt-Riedrode (DE); Friedrich Siebers, Nierstein (DE)

(73) Assignee: Schott AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/948,792

(22) Filed: Nov. 18, 2010

(65) Prior Publication Data

US 2011/0062393 A1    Mar. 17, 2011

Related U.S. Application Data

(63) Continuation of application No. 11/757,534, filed on Jun. 4, 2007, now Pat. No. 7,910,505.

(30) Foreign Application Priority Data

Jun. 6, 2006 (DE) .................. 10 2006 027 307

(51) Int. Cl.
*C03C 10/02* (2006.01)
(52) U.S. Cl. .............................. 501/10; 65/33.1; 65/33.6
(58) Field of Classification Search .................... 501/10; 65/33.1, 33.6
See application file for complete search history.

(56) References Cited

U.S. PATENT DOCUMENTS

| 3,843,551 | A | 10/1974 | Muller et al. |
| 6,475,938 | B1 | 11/2002 | Budd |
| 6,984,261 | B2 | 1/2006 | Cummings et al. |
| 2002/0094929 | A1 | 7/2002 | Kawai et al. |
| 2003/0025449 | A1 | 2/2003 | Rossner |
| 2006/0181196 | A1 | 8/2006 | Peuchert et al. |
| 2007/0012887 | A1 | 1/2007 | Letz et al. |
| 2008/0041106 | A1 | 2/2008 | Seneschal-Merz et al. |

FOREIGN PATENT DOCUMENTS

| EP | 1 171 392 B1 | 1/2002 |
| EP | 1 642 869 A1 | 4/2006 |
| JP | 63-319230 | 12/1988 |
| JP | 4-119941 | 4/1992 |
| JP | 2005-029431 | 2/2005 |
| WO | WO 2005/000743 A2 | 1/2005 |
| WO | WO2005/097938 A1 | 10/2005 |

*Primary Examiner* — Karl Group
(74) *Attorney, Agent, or Firm* — Harness, Dickey & Pierce, P.L.C.

(57) ABSTRACT

The invention provides a method for producing a glass ceramic comprising the steps of melting a starting glass that is free from alkali, except for incidental contamination, and that contains at least one garnet-forming agent and at least one oxide of a lanthanoid; grinding the starting glass to produce a glass frit; molding by pressing and sintering the glass frit until at least one garnet phase containing lanthanoids is formed. A glass ceramic produced in this way may contain 5-50% by weight of $SiO_2$, 5-50% by weight of $Al_2O_3$ and 10-80% by weight of at least one oxide selected from the group formed by $Y_2O_3$, $Lu_2O_3$, $Sc_2O_3$, $Gd_2O_3$, $Yb_2O_3$, $Ce_2O_3$, as well as 0.1-30% by weight of at least one oxide selected from the group formed by $B_2O_3$, $Th_2O_3$, and oxides of the lanthanoids, except $Lu_2O_3$, $Gd_2O_3$, $Yb_2O_3$, $Ce_2O_3$. Such a glass ceramic is suited especially for down conversion of excitation radiation in the blue and in the UV region of the spectrum.

21 Claims, 1 Drawing Sheet

10 µm

US 8,039,407 B2

SINTERED GLASS CERAMIC AND METHOD FOR PRODUCING THE SAME

RELATED APPLICATIONS

This application is a continuation of U.S. Ser. No. 11/757,534, filed Jun. 4, 2007, now U.S. Pat. No. 7,910,505, which claims priority of German Patent Application 10 2006 027 307.9 filed on Jun. 6, 2006, the contents of which is fully incorporated by reference.

BACKGROUND OF THE INVENTION

The present invention relates to a sintered glass ceramic, to a method for producing the same and to an advantageous application of such a sintered glass ceramic.

Recently, LEDs have been employed to an increasing degree for lighting purposes because they offer a number of advantageous properties including, for example, high efficiency due to direct conversion of electric energy to light energy, and high compactness.

However, until a few years ago LEDs were employed in "low-emitting" applications only, especially for indication purposes. The high potential of LEDs for applications with high light demand was discovered only recently when increased efforts were made to achieve improved energy input coupling and improved heat management.

LEDs produce light in a very narrow spectral band, while in most of the cases white light is required for illumination purposes. Commercially available white LEDs use a III-V semiconductor emitter for stimulating a luminescent material that emits a secondary wavelength in a lower wavelength band (down conversion). One known solution uses a blue InGaN/GaN LED for stimulating YAG:Ce, a broadband yellow luminescent material. With these LEDs, that have been converted using a luminescent material, a given proportion of the emitted blue light passes the luminescent layer covering the LED chip so that the overall spectrum obtained assumes a color very close to white light. Due to the absence of spectral portions in the blue/green band and in the red wavelength band, the resulting color is, however, not satisfactory in most of the cases.

US 2003/0025449 A1 discloses a hybrid LED comprising a radiation-emitting semiconductor body (chip) which is in direct contact, via an optical coupling agent, with a glass ceramic body that serves as a conversion agent. The glass ceramic body contains crystallites of the garnet type doped with rare earths (such as YAG:CE), thiogalate or chlorosilicate as luminescent material. The starting glasses from which such glass ceramics are produced consist of silicate glasses or borate glasses. The luminescent glass ceramic is produced by mixing a glass frit with a suitable proportion of a luminescent material in powder form, and the mixture is molten, then cast and molded to achieve the desired shape. It is possible in this way, from the very beginning, to produce a glass ceramic body in the desired shape, advantageous for the intended application, for example in the form of a lens.

However, that document does not disclose the way in which to produce such a luminescent glass ceramic having a garnet phase, with properties as advantageous as possible. Rather, the document merely relates to the melting technology used for production in a general way.

EP 1 642 869 A1 discloses a glass ceramic which preferably is used for down-conversion of excitation radiation in the blue and UV regions of the spectrum. The glass ceramic comprises the following components (on an oxide basis): 5-50% by weight of $SiO_2$, 5-50% by weight of $Al_2O_3$, 10-80% by weight of $Y_2O_3$, 0-20% by weight of $B_2O_3$, 0.1-30% by weight of rare earths, preferably 15-35% by weight of $SiO_2$, 15-35% by weight of $Al_2O_3$, 25-60% by weight of $Y_2O_3$, 1-15% by weight of $B_2O_3$ and 1-15% by weight of rare earths. The glass ceramic contains crystalline phases in which rare-earth ions are taken up at least in part. Crystalline phases containing yttrium ions as a component are replaced by rear-earth ions in this case at least in part. The phases in question may include, for example, $Y_3Al_5O_{12}$ (YAG), $Y_2SiO_5$, $Y_2Si_2O_7$, $SrAl_2O_4$, $BaMgAl_{10}O_{17}$, $Sr_2P_2O_7$, $Sr_4Al_{14}O_{25}$ and $YbO_3$, that serve as host phase for taking up rare-earth ions at least in part.

The respective glasses are produced by a technological melting process and may then be ceramized. Ceramization is effected by initial tempering at a nucleation temperature of between 850° C. and 900° C., for a period of several hours, and then ceramizing at a temperature of between 1050 to 1150° C. for the time of one hour. The crystal phases identified in this case were $Y_2Si_2O_7$, $Y_2SiO_5$, $YbO_3$.

The conversion efficiency of such glass ceramics is, however, not yet sufficient for many applications because the glass ceramic contains a number of non-convertible crystal phases such as $Y_2Si_2O_7$.

JP(A) H04-119941 further discloses a glass ceramic that contains 5-50% by weight of $SiO_2$, 5-70% by weight of $Al_2O_3$, 10-70% by weight of $Y_2O_3$ and 0.1 to 30% by weight of a nucleation agent such as MgO, $TiO_2$, $ZrO_2$ or $La_2O_3$. For the production process, starting materials (oxides) are mixed with organic solvents and binders, and are heated to then form a shaped glass by solid-state reaction. The glass so produced is then subjected first to a nucleation process, by tempering at temperatures of between 950° C. and 1010° C., and then to ceramization at a temperature of approximately 1100° C.

The production process is relatively complex. And in addition, the glass ceramic has a conversion efficiency not sufficient for all applications.

From US 2002/0094929 A1, there are known a glass ceramic product and a method for producing the same, containing a garnet phase, a celsian crystal phase having the composition $BaAl_2Si_2O_8$ as well as at least one crystal phase having the composition AlN, $Si_3N_4$, SiC, $Al_2O_3$, $ZrO_2$, $3Al_2O_3 \cdot 2SiO_2$ or $Mg_2SiO_4$. Production is effected by sintering at a temperature of 700 to 1000° C.

The known glass ceramic is suited for use as an insulating substrate in a housing intended to accommodate semiconductor chips.

A glass ceramic known from U.S. Pat. No. 3,843,551 is used as luminescent laser material. The glass ceramic consists of 45-68% by weight of $SiO_2$, 15-30% by weight of $Al_2O_3$, 0-10% by weight of $P_2O_5$, 2-6% by weight of $Li_2O$, 0-3% by weight of MgO, 0-8% by weight of ZnO, 2-7% by weight of $ZrO_2$, 1-7% by weight of $Ta_2O_5$, 0-12 by % by weight of lanthanoids, as well as refining agents. The glass ceramic is ceramized by tempering a starting glass over a plurality of hours at 800° C.

While such a glass ceramic is especially well suited as laser material, it is not suited for down-conversion of LED radiation.

SUMMARY OF THE INVENTION

In view of this it is a first object of the present invention to provide a method for producing a glass ceramic, whereby particularly advantageous radiation conversion properties can be achieved, in particular for down-conversion of LED radiation.

It is a second object of the present invention to provide a very economical method for producing a glass ceramic.

It is a third object of the present invention to provide a method for producing a glass ceramic which is easily reproducible in order to also permit production at a large technological scale.

It is a forth object of the invention to disclose a glass ceramic having particularly advantageous radiation conversion properties, in particular for down-conversion of LED radiation.

These and other objects are achieved according to the invention by a method for producing glass ceramics comprising the following steps:

melting a starting glass that is free from alkali except for incidental contamination, and that contains at least one garnet-forming agent and at least one oxide of a lanthanoid;

grinding the starting glass to produce a glass frit; and sintering the glass frit until at least one garnet phase containing lanthanoids is formed.

The invention is further realized by a sintered glass ceramic which is free from alkali, except for incidental contamination, and which contains at least one garnet phase that contains at least one lanthanoid.

According to the invention it was found that when heating up the cooled-down glass in the process of ceramizing a starting glass of conventional composition for crystallization, starting from room temperature, undesirable non-convertible crystal phases (yttrium silicates, for example $Y_2Si_2O_7$ in different isotypes) are formed as a first step and that the desired crystal phases doped with rare earths, for example YAG ($Y_3Al_5O_{12}$), are formed only at a higher temperature. During known production of glass ceramics by technological melting processes, a homogeneous glass is molten in a first step and is then tempered for an extended period, initially at a lower nucleation temperature and then at a higher ceramizing temperature, in order to thereby achieve controlled crystallization or partial crystallization. According to the invention it was recognized that in the conventional production route crystallization of the desired crystal phases is suppressed in part or even prevented altogether when the undesirable yttrium silicates are precipitated at lower temperature because large parts of the yttrium are then chemically combined. Aluminum silicate phases, which are absolutely unsuited for light conversion (for example mullite: $3Al_2O_3.2SiO_2$) are precipitated as secondary phases. Further, the doping elements added, such as cerium, are likewise combined in the crystal phases, or are converted into an oxidation stage unsuitable for efficient conversion of the blue light.

The method according to the invention prevents such disadvantages found in the prior art by sintering a suitable starting glass until the desired garnet phase is formed. The formation of undesirable, non-convertible crystal phases is avoided in this way. The glass ceramic so produced provides very good conversion efficiency.

Due to the sintering process even crystal phases that otherwise can be obtained by surface crystallization only (such as YAG) can be precipitated in the volume of the sintered body. This leads to further improvement of the conversion process.

The glass ceramics according to the invention are produced by pressing fine powders (normally <100 μm) of a starting glass in a mould and than simultaneously sintering and crystallizing that material by subsequent temperature treatment. In addition to crystalline phases, the resulting product contains considerable proportions of glassy products (glass ceramic>approximately 5% by vol. of glass phase, contrary to ceramics) and shows closed porosity of preferably <10% by vol., more preferably <5% by vol., most preferably <1% by vol., depending on the starting particle size and the sintering conditions.

The starting glass used preferably is one that contains (on an oxide basis) 5-50% by weight of $SiO_2$, 5-50% by weight of $Al_2O_3$ and 10-80% by weight of at least one oxide selected from the group formed by $Y_2O_3$, $Lu_2O_3$, $Sc_2O_3$, $Gd_2O_3$, $Yb_2O_3$, $Ce_2O_3$, as well as 0.1-30% by weight of at least one oxide selected from the group formed by $B_2O_3$, $Th_2O_3$, and oxides of the lanthanoids, except $Lu_2O_3$, $Gd_2O_3$, $Yb_2O_3$, $Ce_2O_3$.

Such starting glasses are thermodynamically stable for being produced by a technical glass-production process (pot-melting or tank-melting).

According to the invention it is possible, by different measures, to obtain a material with very low porosity.

In order to keep porosity low, different approaches have been known in principle in the prior art.

A) Sintering of glass powders under vacuum;

B) Sintering of glass powders with bimodal or multimodal particle size distribution: Starting out from the model of tightest sphere packing, as approximation to the powder molding, packing densities >0.73 and, thus, lower porosities are imaginable and feasable in this way when powder of different particle sizes is mixed where the smaller particle size fits exactly into the octahedron or tetrahedron gaps of the tightly packed larger particle size.

C) Common sintering of a starting glass with an "inert glass" having a lower melting temperature: The low-melting glass is liquid/viscous at the sintering/ceramizing temperature of the starting glass and flows into the cavities.

According to the invention, an optimum with respect to particle size distribution, sintering temperature, heating rate and holding time at the sintering temperature is sought for the production of sintered glass ceramics in order to achieve maximum sintering and maximum crystallization of the desired phase and a minimum crystallite size for transparent/translucent glass ceramics.

Variants A, B and C are preferred embodiments of the invention. Combining the embodiments A, B and C is advantageous and preferred according to the invention.

The quantity of inert glass to be added for variant C depends on the porosity that is to be expected considering the particle size distribution and the sintering conditions, which is to be closed by displacement. In selecting a powdered low-melting inert glass, one proceeds as follows, according to the invention:

1) The inert glass should have a low viscosity at the sintering temperature Ts (preferably <Va; Va=T(lgη/dPas=4)). Preferably, the sintering temperature of the starting glass Ts (G) is higher by at least 200 K than the processing temperature Va (I) of the inert glass, preferably Ts (G)–Va (I)>200 K.

2) The inert glass should have little tendency to crystallize at the sintering temperature (the upper devitrification limit of the inert glass OEG(I) serves as a measure in this respect), preferably: Ts(G)–OEG (I)>0 K more preferably: Ts(G)–OEG (I)>25 K.

3) The inert glass should permit high wetting of the starting glass G by the inert glass I. This is reached by chemical similarity between the glass I and the glass G: Both should be oxidic glasses.

4) The starting glass G should have chemical stability to attack by the molten inert glass I. There should be no inhibiting influence on the crystallization process of the starting glass G by the inert glass I (for example by diffusion processes).

5) Preferably, the inert glass I acts as a catalyst for crystallization in the starting glass G.

6) The inert glass should have high optical transparency to excitation light and fluorescent light.

7) The inert glass should have a high index of refraction $n_d(I)$ at a low Abbe's coefficient $v_d(I)$, preferably adapted to the desired lanthanoid-doped crystal phase such as Ce:YAG.

In particular, adapting the index of refraction of the inert glass I to that of the desired conversion crystal phase is advantageous according to the invention because, when the indices of refraction are well adapted, coupling-in the blue excitation light into the YAG crystals and coupling-out the yellow fluorescent light from the crystals are effected without substantial losses by total reflection and reflection at the YAG|inert glass phase boundaries. Low light losses due to optical aberration are achieved by the low Abbe's coefficient of the glass (I). Preferably:

$$|n_d(YAG)-n_d(I)|\leq 0.1,$$

more preferably $|n_d(YAG)-n_d(I)|\leq 0.05$.

For a given index of refraction $n_d$, for example for $(Ce_{0.09}Y_{2.91}Al_5O_{12})=1.83$, the index of refraction of the inert glass therefore is $$n_d(I)=1.78\ldots 1.88.$$

A first embodiment of a suitable inert glass comprises 0.5-1.5% by weight of $SiO_2$, 28-34% by weight of $B_2O_3$, 0.1-0.3% by weight of BaO, 1.5-4% by weight of ZnO, 43-49% by weight of $La_2O_3$, 7-11% by weight of $Y_2O_3$, 2.5-4% by weight of $Nb_2O_5$, 6-8% by weight of $ZrO_2$ and 0.3-1% by weight of $WO_3$.

A second embodiment of a suitable inert glass comprises 4-6% by weight of $SiO_2$, 19-23% by weight of $B_2O_3$, 21-27% by weight of ZnO, 34-40% by weight of $La_2O_3$, 6-8% by weight of $Nb_2O_5$, 3-5% by weight of $ZrO_2$ and 0.5-1.5% by weight of $WO_3$.

A third embodiment of a suitable inert glass comprises 4-7% by weight of $SiO_2$, 18-21% by weight of $B_2O_3$, 22-25% by weight of ZnO, 34-39% by weight of $La_2O_3$, 7-9% by weight of $Nb_2O_5$, 4-7% by weight of $TiO_2$ and 2-4% by weight of $ZrO_2$.

Temperature treatment is preferably controlled so that during ceramization a crystal phase content of 10 to 95%, more preferably of 20 to 80%, most preferably of 25 to 75%, is obtained in a residual glass phase.

It is possible in this way, by suitably controlling the process, to adjust and optimize the crystal phase content according to the desired application.

The at least one garnet phase is a phase of the type $A_3B_2C_3O_{12}$, wherein

A as distorted cubes are coordinated locations for large ions;

B are octahedron locations;

C are tetrahedron locations.

When A and C are occupied by trivalent cations (for example by $Y^{3+}$ and by $Al^{3+}$), then location B can be taken by a trivalent lanthanoid cation such as $Ce^{3+}$. Due to the small spacing to the next oxygen atoms, the tetrahedron locations can accommodate a small cation only, such as aluminum or silicon. The octahedron location must in any case be occupied by a trivalent cation.

Although a configuration where A is occupied by a bivalent cation (for example $Ba^{2+}$) and C is occupied by a quadrivalent cation (such as $Si^{4+}$) is likewise imaginable, it is not preferred for that application.

The garnet phases doped with at least one lanthanoid, produced during the ceramization process, may be garnet phases such as $Y_3Al_5O_{12}$ (YAG), $Lu_3Al_5O_{12}$ (LuAG), $Gd_3Al_5O_{12}$ (GdAG), $Yb_3Al_5O_{12}$ (YbAG), $Y_3Sc_2Al_3O_{12}$, $Y_3Sc_2Al_3O_{12}$, $Lu_3Sc_2Al_3O_{12}$, $Gd_3Sc_2Al_3O_{12}$ and $Yb_3Sc_2Al_3O_{12}$. For example, they may be $Ce_{0.09}Y_{2.91}Al_5O_{12}$.

According to another way of carrying out the invention, a garnet phase is produced during ceramization which is doped with at least one element selected from the group formed by the lanthanoids cerium, lanthanum, praseodymium, neodymium, samarium, europium, terbium, dysprosium, holmium, erbium, thulium and thorium.

By doping additionally with further lanthanoids, such as Tm, Tb, Dy, Sm, etc., it is possible to optimize color location, color temperature and the color reproduction index (CRI) and to adapt them to special conversion tasks.

According to a further way of carrying out the invention, a glass ceramic comprising a content of lanthanoids of 0.1 to 20% by weight, preferably 1 to 15% by weight, more preferably 2 to 10% by weight, is produced during ceramization.

The content of lanthanoids in the glass ceramic can be adapted in this way to the desired conversion task in order to achieve the best possible conversion result.

Except for incidental contamination, the starting glass used preferably is free from alkali oxides, further from PbO, further free from $TiO_2$, further free from MgO, and preferably free from $ZrO_2$.

Further, the starting glass used preferably comprises the following components (in % by weight on an oxide basis):

| | |
|---|---|
| $Y_2O_3 + Lu_2O_3 + Sc_2O_3 + Gd_2O_3 + Yb_2O_3$ | 25-60 |
| $SiO_2$ | 10-40 |
| $Al_2O_3$ | 10-40 |
| $B_2O_3$ | 0-20 |
| lanthanoids | 0.1-20. |

Further it is preferred that the starting glass used comprises the following components (in % by weight on an oxide basis):

| | |
|---|---|
| $Y_2O_3$ | 30-50 |
| $SiO_2$ | 15-35 |
| $Al_2O_3$ | 15-40 |
| $B_2O_3$ | 0-10 |
| lanthanoids | 1-20. |

According to a further embodiment of the invention the starting glass as well as the inert glass do not contain any further components, apart from the components explicitly given and apart from refining agents and incidental contamination.

Throughout this application, the term "incidental contamination" is understood to be a contamination by a maximum amount of 0.5 percent by weight, or when very pure ingredients are used, by a maximum amount of 0.1 percent by weight, or even by a maximum amount of 0.05 percent by weight.

The content of $Y_2O_3$ may be replaced in full or in part by $Lu_2O_3$, $Sc_2O_3$, $Gd_2O_3$ and/or $Yb_2O_3$. According to a further embodiment of the invention, the starting glass is one that contains no further components, except for refining agents and incidental contamination.

The lanthanoids preferably may be at least one of the elements cerium or europium, although the other lanthanoids may be used as well and, in addition, small quantities of other lanthanoids may be additionally doped for optimizing color location, color temperature and the color reproduction index.

Heating up to sintering temperature may be effected preferably using infrared radiation by short-wave infrared radiant (SIR) heaters. A SIR heating unit suited for that purpose has been known, for example, from EP 1 171 392 B1 which is fully incorporated by reference in this regard. The wall and roof surfaces of such a heating unit consist of a highly IR-reflective material such as quarzal.

Using such a heating method very short treating times (for example a heating-up time of 0-2 min, preferably 10 s to 60 s, more preferably 20 s to 40 s to the sintering temperature, followed by a cooling-down step and, if necessary, short-time holding at the sintering temperature for 30 to 60 sec) and very good sintering results with little porosity and practically exclusive formation of garnet phases are achieved.

The sample to be sintered is preferably placed in this case on a support in powder form, consisting for example of $Al_2O_3$ powder or $SiO_2$ powder.

This prevents the sample from sticking.

The support used may alternatively also consist of quartz glass or another high-melting glass.

Further, the support may consist of platinum or another highly IR-absorbing material.

As has been mentioned before, a glass ceramic produced according to the invention preferably is used as radiation conversion body for converting a first radiation into a radiation with a different energy content or a different spectral distribution, preferably for down-conversion of excitation radiation in the blue and the UV region of the spectrum.

According to another embodiment of the invention, the radiation conversion body is produced in a thickness of 0.01 to 0.5 mm, preferably 0.05 to 0.2 mm.

This allows conversion over a short length.

According to a further embodiment of the invention, the radiation conversion body is produced in a length of 0.1 to 10 mm, preferably 0.2 to 5 mm, more preferably 0.5 to 2 mm.

Such a geometry allows the body to be suitably adapted to the solid-state transitions of the respective LED chips.

It is understood that the features of the invention mentioned above and those yet to be explained below can be used not only in the respective combination indicated, but also in other combinations or in isolation, without leaving the scope of the invention.

BRIEF DESCRIPTION OF THE DRAWINGS

Further features and advantages of the invention will become apparent from the description that follows of a preferred embodiment of the invention, with reference to the drawing. In the drawings.

DETAILED DESCRIPTION OF THE PREFERRED EMBODIMENTS

Figure 1:
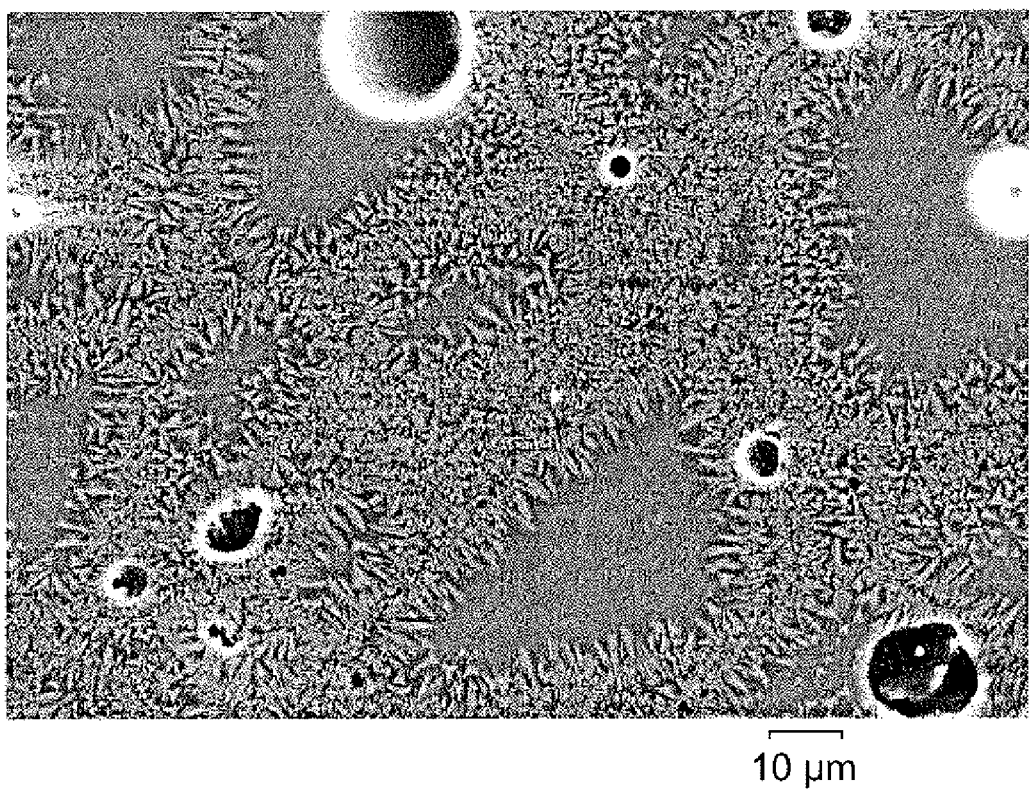
FIG. 1 shows a scanning electron microscope pattern (SEM) of a glass ceramic produced according to the invention.

The glass ceramics according to the invention are produced by pressing fine powders (particle size normally <100 μm) of a starting glass in a mold and then simultaneously sintering and crystallizing the material by subsequent temperature treatment. The product so obtained contains, in addition to crystalline phases, considerable portions of glassy materials (glass ceramics>approximately 5% by vol. of glass phase, in contrast to ceramics) and shows closed porosity, depending on the starting particle size and the sintering conditions.

EXAMPLES

TABLE 1

| % by weight | G1 | G2 | G3 | G4 | G5 | G6 | G7 | G8 | G9 |
|---|---|---|---|---|---|---|---|---|---|
| $Y_2O_3$ | 46.4 | 43.7 | 44.88 | 44.88 | 38.5 | 34.14 | 41.9 | 39.6 | 40.4 |
| $SiO_2$ | 23.6 | 22.3 | 28.29 | 28.29 | 21 | 39.02 | 22.85 | 21.6 | 22 |
| $Al_2O_3$ | 20.9 | 31 | 24.39 | 24.39 | 29.6 | 24.39 | 32.25 | 30.4 | 31 |
| $B_2O_3$ | 6.4 | | | | | | | | 0.8 |
| $Eu_2O_3$ | 2.7 | | 2.44 | | | 2.45 | | | |
| $CeO_2$ | | 3 | | 2.44 | 10.9 | | 3 | 8.4 | 5.7 |
| Total | 100 | 100 | 100 | 100 | 100 | 100 | 100 | 100 | 99.9 |

Table 1 summarizes different compositions of starting glasses that are used for production of the glass ceramics according to the invention.

The starting glasses used all are thermodynamically stable, for being produced by a technical glass production process (pot-melting or tank-melting) and for being molded by a technical hot-molding process.

The starting glasses G1 to G9 (compare Table 1) are molten in platinum melting pots at a temperature of approximately 1550 to 1600° C. and are homogenized. After cooling down to room temperature, a homogeneous, clear, transparent glass is obtained. The glasses obtained are quenched and ground.

Table 3 contains under "Variant A" seven Examples Nos. 1 to 7 that have been sintered under vacuum in order to achieve the lowest possible porosity. For this purpose, 100 g of the respective glass G7 of the stated particle size fraction (d50; d90) were isostatically cold-pressed at a pressure of 6300 bar, to a sample size of 1.5×1×3 cm. The samples were placed in the pre-heated sintering furnace, were isothermally sintered for the stated sintering time, whereafter the furnace was switched off and the samples were removed after they had cooled down.

Except for Example No. 3, all samples yielded transparent glass ceramics that predominantly contained a YAG phase. The porosity for Examples Nos. 3 to 7 is smaller than 5 μm in all cases and, accordingly, is sufficiently low for most of the applications.

An even lower porosity is obtained when different particle size distributions of the same or of different starting glasses are mixed.

A bimodal particle size distribution of the starting powder of the sintered glass ceramics is obtained when differently fine powders of the starting glasses are intimately mixed in advantageous ratios before they are pressed and sintered.

Advantageous mixtures of such particle fractions are mixed in ratios that on the one hand increase the packing density while, on the other hand, they do not obstruct common sintering by surface crystallization effects that take place more rapidly in a smaller particle.

It has been found that the starting glasses according to the invention, consisting of a mixture of 75% by weight of powder with a particle size of $d_{50}=B1$ µm and 25% by weight of powder with a particle size of $d_{50}=B2$ µm, provide especially low-porous sintered glass ceramics according to the invention when:

$$B2 = f \cdot B1; f = 0.1 \ldots 0.3$$

The factor depends on the width of the particle size distribution of powders 1 and 2. The factor for a very tight particle size distribution ($d_{90}-d_{50} \leq d_{50}/5$) and spherical particles is 0.26±0.01.

Such an example with bimodal particle size distribution is found in Table 3 under Example No. 8 (isothermal sintering under vacuum, with otherwise identical conditions as in Examples 1-7).

In this case, the only crystalline phase detected was YAG. Porosity is lower than 1% by vol.

TABLE 2

| | % by weight | | | |
|---|---|---|---|---|
| | I1 | I2 | I3 | I4 |
| $SiO_2$ | 0.5-1.5 | 4-6 | 4-7 | 5 |
| $B_2O_3$ | 28-34 | 19-23 | 18-21 | 20 |
| $Al_2O_3$ | | | | |
| $Li_2O$ | | | | |
| $Na_2O$ | | | | |
| $K_2O$ | | | | |
| MgO | | | | |
| CaO | | | | |
| BaO | 0.1-0.3 | | | |
| SrO | | | | |
| ZnO | 1.5-4 | 21-27 | 22-25 | 24 |
| $La_2O_3$ | 43-49 | 34-40 | 34-39 | 36 |
| $Gd_2O_3$ | | | | |
| $Y_2O_3$ | 7-11 | | | |
| $Ta_2O_5$ | | | | |
| $Nb_2O_5$ | 2.5-4 | 6-8 | 7-9 | 8 |
| $TiO_2$ | | | 4-7 | 4 |
| $ZrO_2$ | 6-8 | 3-5 | 2-4 | 3 |
| PbO | | | | |
| $WO_3$ | 0.3-1 | 0.5-1.5 | | |

Glass I4, for example, has an index of refraction of 1.8 at 588 nm and an Abbe's coefficient of 41.3.

TABLE 3

| Example No. | Glass | d50 [µm] | d90 [µm] | Sintering temp. [° C.] | Sintering time [min] | Mixture [% by weight] | Crystal | Pores |
|---|---|---|---|---|---|---|---|---|
| Variant A | | | | | | | | |
| 1 | G7 | 30 | 65 | 1030 | 30 | 100 | YAG | <10 µm |
| 2 | G7 | 30 | 65 | 1050 | 60 | 100 | YAG | <10 µm |
| 3 | G7 | 10 | 29 | 980 | 15 | 100 | Amorphous to X-rays | <5 µm |
| 4 | G7 | 10 | 29 | 1080 | 15 | 100 | YAG + $Y_2Si_2O_7$ + $Al_6Si_2O_{13}$ | <5 µm |
| 5 | G7 | 10 | 29 | 1080 | 30 | 100 | YAG + very little $Y_2Si_2O_7$ + very little $Al_6Si_2O_{13}$ | <5 µm |
| 6 | G7 | 10 | 29 | 1030 | 15 | 100 | little crystal: YAG + $Y_2Si_2O_7$ + $Al_6Si_2O_{13}$ | <5 µm |
| 7 | G7 | 10 | 29 | 1020 | 60 | 100 | YAG + very little $Y_2Si_2O_7$ + very little $Al_6Si_2O_{13}$ | <5 µm |
| Variant B | | | | | | | | |
| 8 | G9 | 22 | 47 | 1060 | 35 | 75 | YAG | <1 µm |
| | G9 | 5 | 14 | | | 25 | | |
| Variant C | | | | | | | | |
| 9 | G5 | 15.4 | 37 | 1080 | 30 | 85 G5 | YAG + very little $Y_2Si_2O_7$ + very little $Al_6Si_2O_{13}$ | <1 µm |
| | I5 | 19 | 56 | | | 15 I5 | | |

As has been explained before, another variant, suited for achieving very low porosity, consists in admixing a glass frit of an inert glass I to the glass frit of the starting glass, where the inert glass is already liquid at the sintering temperature Ts of the starting glass thereby filling the cavities between neighboring particles by viscous flowing.

The compositions of possible inert glasses I1 to I5 are summarized in Table 2.

An example of that kind, which has been produced using the inert glass I5, is listed as Example 9 in Table 3 under "Variant C" (otherwise identical pressing and sintering conditions as for Examples 1-8).

As can be seen in Table 3, the pore size is below 1% by vol. The crystal phase detected was predominantly YAG.

Figure 2:
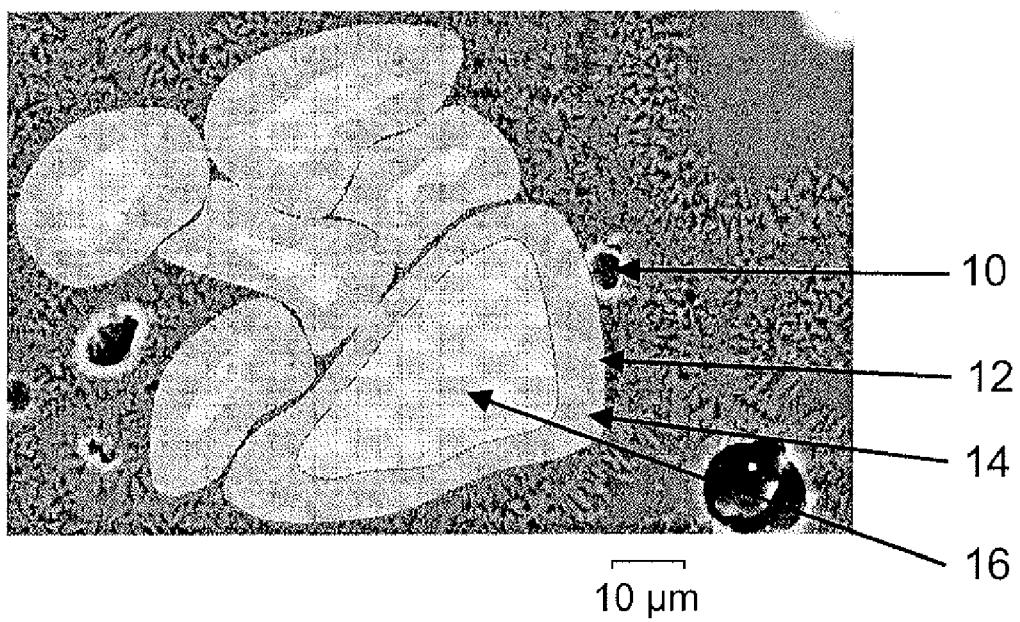
FIG. 2 shows a detail of FIG. 1 that illustrates the different crystal phases.

FIGS. 1 and 2 show a SEM pattern of a sample from Example No. G7 in Table 1. The pores are indicated by reference numeral 10. A crystallite 12 comprises a marginal YAG phase 14 and a core 16 of mullite.

The invention claimed is:

1. A method for producing a radiation conversion body consisting of a glass ceramic for converting a first radiation into a radiation of a different spectral distribution, the method comprising the steps of:
   melting a starting glass that is free from alkali metal oxides except for incidental contamination, and that contains at least one garnet-forming agent and at least one oxide of a lanthanoid;
   grinding the starting glass to produce a glass frit; and
   sintering the glass frit until at least one garnet phase comprising YAG, LuAG, or GdAG and doped with lanthanoids is formed;
   wherein said starting glass is free from CaO.

2. The method as defined in claim 1, wherein a starting glass is molten that comprises (on an oxide basis) 5-50% by weight of $SiO_2$, 5-50% by weight of $Al_2O_3$ and 10-80% by weight of at least one oxide selected from the group consisting of $Y_2O_3$, $Lu_2O_3$, $Sc_2O_3$, $Gd_2O_3$, $Yb_2O_3$, $Ce_2O_3$, as well as 0.1-30% by weight of at least one oxide selected from the group consisting of $B_2O_3$, $Th_2O_3$, and oxides of the lanthanoids, except $Lu_2O_3$, $Gd_2O_3$, $Yb_2O_3$, $Ce_2O_3$.

3. The method as defined in claim 1, wherein said sintering is effected under vacuum.

4. The method as defined in claim 1, wherein different glass frits of at least one starting glass with different particle size distributions are mixed and sintered together.

5. The method as defined in claim 1, wherein a glass frit of at least one starting glass is mixed and sintered with a glass frit of an inert glass that has a lower melting temperature than said starting glass.

6. The method as defined in claim 5, wherein said inert glass used is an optical oxidic glass having an index of refraction $n_d(I)$, wherein the index of refraction of said garnet phase $n_d(G)$ is determined by $|n_d(I)-n_d(G)| \leq 0.1$.

7. The method as defined in claim 5, wherein said inert glass comprises 0.5-1.5% by weight of $SiO_2$, 28-34% by weight of $B_2O_3$, 0.1-0.3% by weight of BaO, 1.5-4% by weight of ZnO, 43-49% by weight of $La_2O_3$, 7-11% by weight of $Y_2O_3$, 2.5-4% by weight of $Nb_2O_5$, 6-8% by weight of $ZrO_2$ and 0.3-1% by weight of $WO_3$.

8. The method as defined in claim 5, wherein said inert glass comprises 4-6% by weight of $SiO_2$, 19-23% by weight of $B_2O_3$, 21-27% by weight of ZnO, 34-40% by weight of $La_2O_3$, 6-8% by weight of $Nb_2O_5$, 3-5% by weight of $ZrO_2$ and 0.5-1.5% by weight of $WO_3$.

9. The method as defined in claim 5, wherein said inert glass comprises 4-7% by weight of $SiO_2$, 18-21% by weight of $B_2O_3$, 22-25% by weight of ZnO, 34-39% by weight of $La_2O_3$, 7-9% by weight of $Nb_2O_5$, 4-7% by weight of $TiO_2$ and 2-4% by weight of $ZrO_2$.

10. The method of claim 1, wherein a further garnet phase doped with at least one lanthanoid is produced during sintering, which is selected from the group consisting of $Lu_3Al_5O_{12}$ (LuAG), $Gd_3Al_5O_{12}$ (GdAG), $Yb_3Al_5O_{12}$ (YbAG), $Y_3Sc_2Al_3O_{12}$, $Y_3Sc_2Al_3O_{12}$, $Lu_3Sc_2Al_3O_{12}$, $Gd_3Sc_2Al_3O_{12}$, and $Yb_3Sc_2Al_3O_{12}$.

11. The method as defined in claim 2, wherein said starting glass, except for incidental contamination, is free from at least one selected from the group consisting of PbO, $TiO_2$, MgO, and $ZrO_2$.

12. The method as defined in claim 2, wherein said starting glass, except for refining agents and incidental contamination, does not contain any further components.

13. The method as defined in claim 1, wherein said starting glass comprises the following components (in % by weight on an oxide basis):

| | |
|---|---|
| $Y_2O_3 + Lu_2O_3 + Sc_2O_3 + Gd_2O_3 + Yb_2O_3$ | 25-60 |
| $SiO_2$ | 10-40 |
| $Al_2O_3$ | 10-40 |
| $B_2O_3$ | 0-20 |
| lanthanoids, except $Lu_2O_3$, $Gd_2O_3$, $Yb_2O_3$, $Ce_2O_3$. | 0.1-20 |

14. The method as defined in claim 1, wherein said starting glass comprises the following components (in % by weight on an oxide basis):

| | |
|---|---|
| $Y_2O_3 + Lu_2O_3 + Sc_2O_3 + Gd_2O_3 + Yb_2O_3$ | 30-50 |
| $SiO_2$ | 15-35 |
| $Al_2O_3$ | 15-40 |
| $B_2O_3$ | 0-10 |
| lanthanoids, except $Lu_2O_3$, $Gd_2O_3$, $Yb_2O_3$, $Ce_2O_3$. | 1-20 |

15. The method as defined in claim 1, wherein a sintering temperature of 900° C. to 1150° C. is used.

16. The method as defined in claim 1, wherein a sintering time of 5-100 minutes is used.

17. The method as defined in claim 16, wherein heating-up to the sintering temperature is effected in 10 seconds to 60 seconds.

18. The method of claim 7, wherein said inert glass, except for refining agents and incidental contamination, does not contain any further components.

19. A method for producing a radiation conversion body consisting of a glass ceramic for converting a first radiation into a radiation of a different spectral distribution, the method comprising the steps of:
    melting a starting glass that is free from alkali metal oxides except for incidental contamination, and that contains at least one garnet-forming agent and at least one oxide of a lanthanoid;
    grinding the starting glass to produce a glass frit; and
    sintering the glass frit until at least one garnet phase containing lanthanoids is formed;
    wherein said starting glass is free from CaO.

20. The method of claim 1, wherein said garnet phase is doped with $Ce_2O_3$.

21. The method of claim 19, wherein said garnet phase is doped with $Ce_2O_3$.

\* \* \* \* \*